Patented Feb. 21, 1933

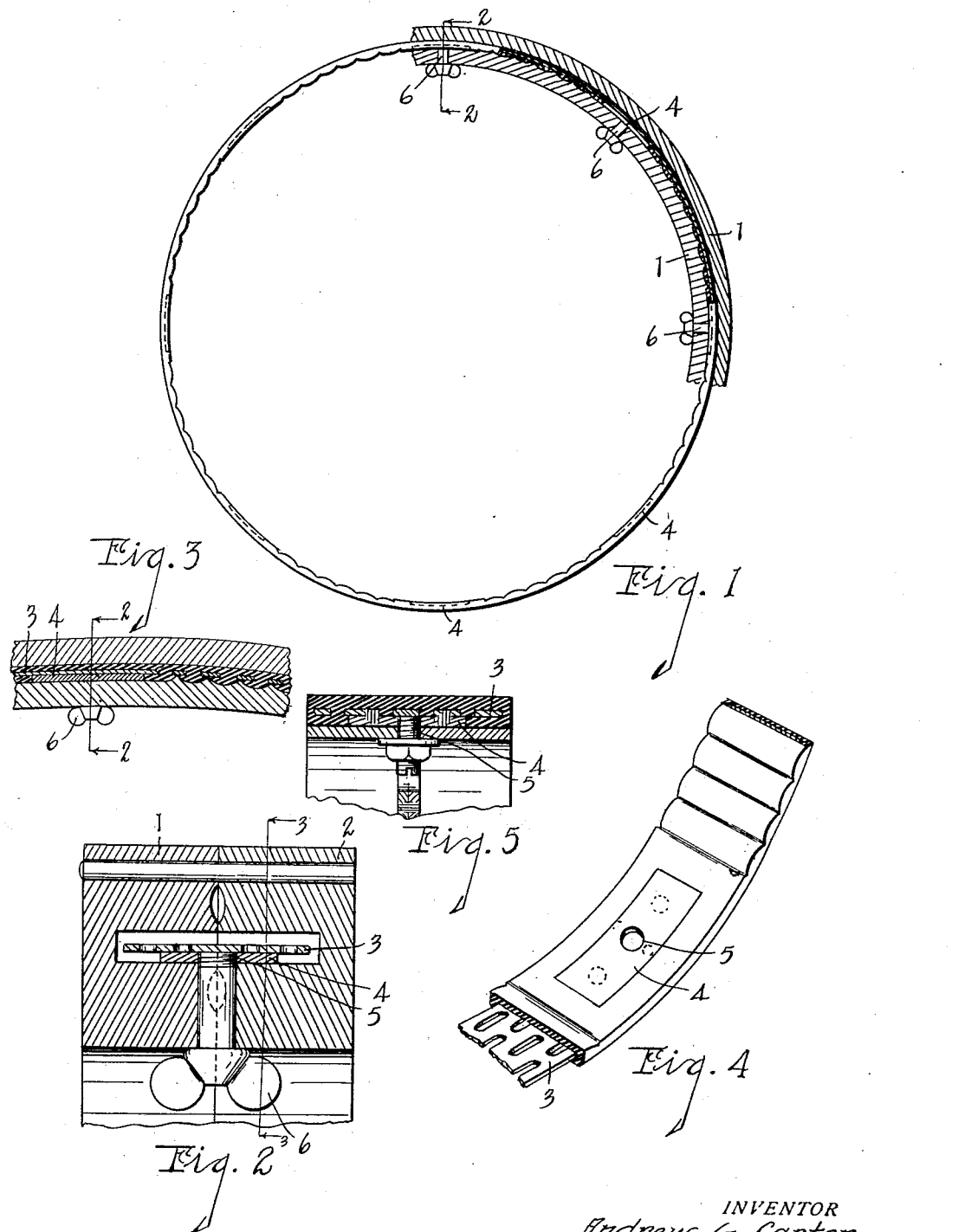

1,898,031

UNITED STATES PATENT OFFICE

ANDREW G. CARTER, OF GRAND RAPIDS, MICHIGAN, ASSIGNOR TO THE CARTER PRODUCTS COMPANY, INC., OF GRAND RAPIDS, MICHIGAN

APPARATUS FOR MANUFACTURING BAND SAW WHEEL TIRES AND THE LIKE

Application filed July 20, 1929. Serial No. 379,688.

This invention relates to improved apparatus and method for manufacturing tires for band saw wheels and for similar purposes.

The object of the invention is to provide a simple and effective apparatus and process for manufacturing tires which shall be true and which are produced with great accuracy and economy.

Apparatus for carrying out my invention is illustrated in the accompanying drawing, in which:

Fig. 1 is a detail elevation view of a mold and contained tire, a part of the top portion of the mold being broken away to show the relation and position of the tire and a portion of the cushion of the tire being shown in section to shown its relation to the supporting core.

Fig. 2 is an enlarged detail transverse sectional view on line 2—2 of Figs. 1 and 3 showing the two halves of the mold, the adjusting screw, the tire core, and a core supporting plate in place without the cushion.

Fig. 3 is a detail longitudinal sectional view on line 3—3 of Figs. 2 and 5 showing the mold with tire in place.

Fig. 4 is a detail perspective view of a section of the tire showing the metallic core and its perforations projecting beyond a portion of the cut away cushion and detailing the scalloped inner cushion.

Fig. 5 is a sectional view through the completed tire showing it applied to a flat rim.

The apparatus comprises a ring mold 1, 1 split in halves and forming a complete ring. The tire comprises a perforated band core 3 with attaching and core supporting plates 4 welded thereto on the inner side with screw threaded bore 5 at the center. The mold is notched with semi-circular openings opposite each supporting tire plate. The tire cores 3 are disposed in the rims and set screws 6 are screwed into the supporting plates, there being eight made use of preferably on an ordinary tire. The number can be increased or lessened as circumstances warrant, the larger the tire the greater number of plates. The inner surface of the mold is flat opposite the supporting plates. Between the plates it is formed in scallops with points outward and transversely across the tire, affording positive support for the perforated core 3.

This insures the centering of the core and an even distribution of cushion material in sections that especially well engage a wheel rim and are very secure.

When the tire is in position the thumb screws 6 are adjusted to tension the core and clamp the support. Strips of rubber that are to be vulcanized are disposed about the core. The mold is then clamped together under pressure. When the tire is thus pressed and tightly molded, proper vulcanizing takes place by the application of the necessary degree of heat. A perfect tire is thus formed with the reinforced band accurately positioned and spaced within it.

Having thus described my invention, what I claim as new and desire to secure by Letters Patent, is:

1. An apparatus for manufacturing a cushion tire for band saw wheels, which tire comprises a central reinforcing band having supporting plates with screw threaded apertures, comprising a ring mold divided into upper and lower members with recesses for forming the tire and with radial relief apertures, and having radially disposed set screws for engaging the screw plates and attaching and adjusting the reinforcing band in position within the mold to receive a body of rubber to be vulcanized.

2. An apparatus for manufacturing a cushion tire for band saw wheels, which tire comprises a central reinforcing band having supporting plates with screw threaded apertures, comprising a ring mold divided into upper and lower members with recesses for forming the tire and with radial relief apertures and with depressed scallops in its inner surface, and having radially disposed set screws for engaging the screw plates and attaching and adjusting the reinforcing band in position within the mold to receive a body of rubber to be vulcanized.

In witness whereof I have hereunto set my hand.

ANDREW G. CARTER.